Jan. 31, 1967  P. R. LEE  3,301,942
INSULATING WASHER
Filed March 29, 1965

WITNESSES
Theodore F. Wrobel
Benjamin B. Shler, Jr.

INVENTOR
Paul R. Lee
BY
Robert T. French
ATTORNEY

United States Patent Office 3,301,942
Patented Jan. 31, 1967

3,301,942
INSULATING WASHER
Paul R. Lee, Mansfield, Ohio, assignor to Westinghouse Electric Corporation, Pittsburgh, Pa., a corporation of Pennsylvania
Filed Mar. 29, 1965, Ser. No. 443,361
3 Claims. (Cl. 174—138)

This invention relates, in general, to washers and, more particularly, to insulating washers held together with a number of other parts in stacked relationship.

Control mechanisms of the type used, for example, in electric water heaters, often utilize a stackup of parts held together by a single rivet. Because some of the electrically conducting parts, for example, a contact assembly and a bimetallic element for moving the contact assembly are usually secured together, they must be insulated from each other if they are to function properly or at all. Consequently, washers made from a suitable dielectric material, for example, ceramic, are used for spacing such parts from each other, the type of material and also the dimensions of the washers depending on the difference in voltage potential between the parts to be insulated.

A primary problem in producing assemblies of the type therein contemplated, when using ceramic washers is breakage of the washers during riveting. This breakage can vary from fine cracks not visible to the naked eye to large chunks of material broken away, thereby creating mechanical instability of the assembly or a substantial reduction in the voltage breakdown characteristics of the material.

This breakage is due to the inability of ceramics to withstand bending stresses caused by uneven compression of the parts during the riveting operation, the uneven compression being caused by such things as, for example: variable thickness of the washer or warped condition thereof, bent rivet shanks, and burrs on sheet metal parts. This problem may be satisfactorily minimized by using materials better able to withstand uneven compression forces during riveting, however, the additional costs of such materials are undesirable.

Accordingly, it is the general object of this invention to provide a new and improved insulating washer.

It is a more particular object of this invention to provide a new and improved insulating washer structure which is inexpensive and which is adapted to minimize bending stresses caused by uneven compressive forces during assembly in a stack-up arrangement.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
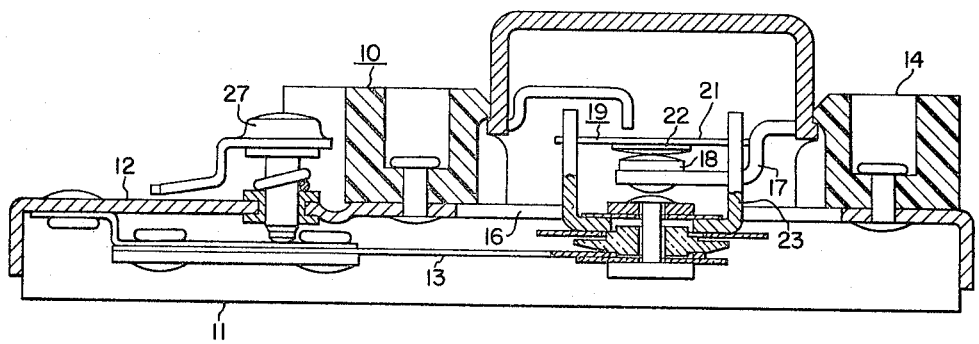
FIGURE 1 is a side elevational view, partly in section, of a water heater control assembly incorporating the invention.

Referring to the drawings, especially FIG. 1, reference character 10 designates generally a water heater control assembly. The assembly 10, which is disclosed for the purpose of illustrating environment in which the invention may be used, comprises a housing 11 which may be of any suitable material adapted for mounting the assembly to a water heater or the like. Mounted to the underside of a top wall 12 of the housing 11, in cantilever fashion, is a snap-action bimetallic element 13. Attached to the top wall 12 is a terminal block 14 having a central opening 16 therein.

The terminal block 14 is made from any suitable electrically non-conducting material and has one end of a pair of contact arms 17 (only one shown) secured to the upper wall thereof adjacent the central opening 16, the free ends of the contact arms 17 extending into the central opening 16. A pair of contacts 18 (only one of which is shown) are carried, one each, by the contact arms 17.

The bimetallic element 13 serves as a contact arm movable in response to temperature changes and has a contact assembly 19 affixed to the free end thereof for movement therewith. The contact assembly 19 comprises a carrier plate 21 having a pair of contacts 22 (only one shown) secured to the underside and at opposite ends thereof. The carrier plate 21 is secured to a U-shaped support member 23 which, in turn, is arranged in a stacked relation with the bimetallic element 13 and insulated therefrom by means of a washer 26, the support 23, the bimetallic element 13, and the washer 26 being rigidly held together by means of a rivet 24.

The carrier plate 21 and contacts 22 carried thereby, provide a closed circuit from one to the other of the contacts 18 when engagement of contacts 22 with contacts 18 is effected by the bimetallic element 13. Periodic engagement and disengagement of the contacts 22 with contacts 18 is accomplished by means of the bimetallic element 13 thereby maintaining the temperature of the heater, controlled by the control assembly 10, substantially constant. The temperatures at which this occurs can be varied by adjusting a screw-type control 27 which engages the bimetallic element 13 and is adapted to move the element 13 either upwardly or downwardly depending on whether an increase or a decrease in the actuation temperature is desired.

Figure 2:
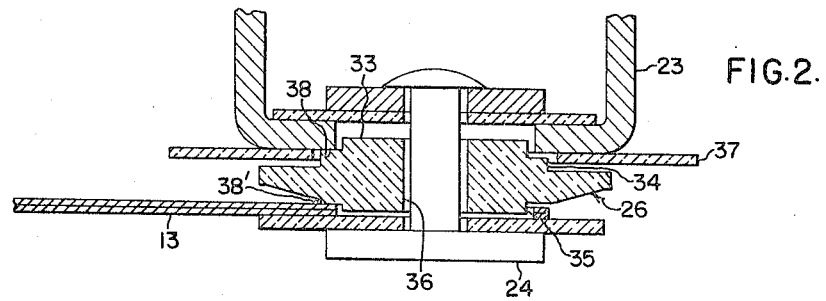
FIG. 2 is an enlarged fragmentary view of a portion of the assembly shown in FIG. 1, better illustrating the invention.
Figure 4:
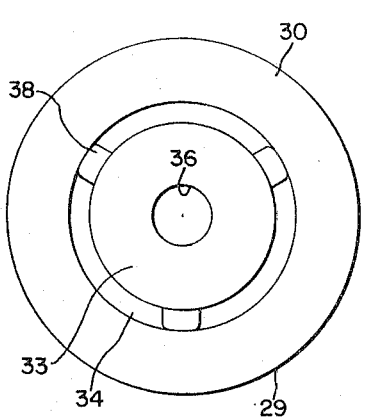
FIG. 4 is an enlarged top plan view of the washer illustrated in FIG. 3.
Figure 3:
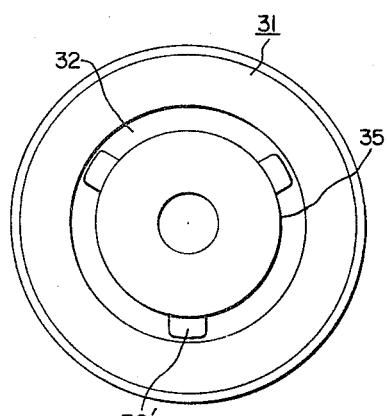
FIG. 3 is a side elevational view of an insulating washer representing the invention.
Figure 5:
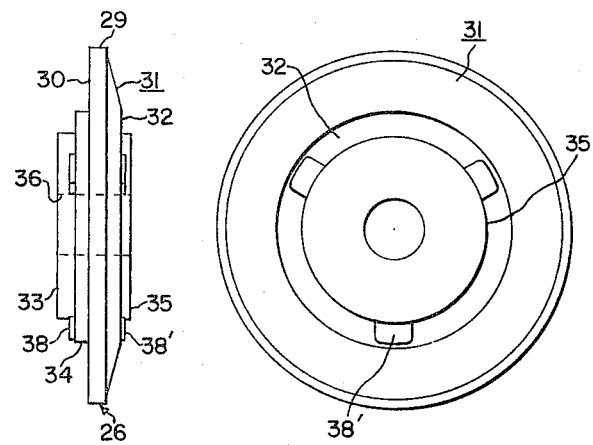
FIG. 5 is a bottom plan view of the washer illustrated in FIGS. 3 and 4.

The washer structure 26 (see particularly FIGS. 2–5) comprises a circular body portion 29 having a planar wall or face 30 and an opposing wall 31 having a planar surface 32 which is substantially parallel to the planar wall 30. The wall 30 is provided with concentric tenons 33 and 34 while the wall 31 is provided with a single tenon 35. While the tenons 33–35 are shown as cylinders it will be understood that they may be of any configuration. An axial bore 36 is provided in the washer structure 26 for receiving the rivet 24. When assembled (see FIG. 2) the tenon 33 extends through a mica washer 37 and an opening in the U-shaped supporting bracket or member 23, the mica washer encompassing the large diameter tenon 34. A plurality of bearing members 38 having planar top surfaces are formed integrally with the free end of the tenon 34 and serve to support the U-shaped bracket 23.

The tenon 35 extends through an aperture in the bimetallic element 13 adjacent its free end, and the surface 32 is provided with three equally spaced bearing members 38'. The bearing members 38' abut the bimetallic element 13 and are directly in line with the bearing members 38 of tenon 34. The washers (spacing and insulating) shown but not discussed do not form a part of the invention, a discussion, thereof, has been omitted for sake of clarity.

It will be apparent that there has been provided a washer structure having equally spaced, in-line bearing members on opposite faces thereof, which bearing members serve to minimize the bending stresses caused by uneven compressive forces, usually experienced during riveting of the washer in stacked relationship with other parts.

While there has been shown and described what is at present considered to be the preferred embodiment of the invention, modifications thereto will readily occur to those skilled in the art. It is not desired, therefore, that the invention be limited to a specific arrangement shown and described and it is intended to cover in the appended claims all such modifications as fall within the true spirit and scope of the invention.

What is claimed is:

1. A washer structure comprising: a circular body of relatively brittle material having substantially parallel faces and an axial bore therethrough, concentric tenons on one of said faces, bearing members equally spaced on the end of one of said concentric tenons, an equal number of bearing members on the other face of said circular body, each of the bearing members on said tenon being directly in line with one of the bearing members on said other face.

2. Structure as specified in claim 1, wherein said tenons are of unequal length and said bearing members are disposed on the end of the shorter of the concentric tenons.

3. Washer structure comprising: a ceramic body having substantially parallel walls and an axial bore therethrough, concentric cylindrical tenons on one of said walls, said concentric tenons being of unequal length, a cylindrical tenon on the other of said walls, a set of three equally spaced bearing members formed integrally with the end of the shorter of said concentric tenons, an equal number of bearing members formed integrally with the other of said walls, each of the latter bearing members being in line with one of the bearing members on the end of the shorter of the concentric tenons.

References Cited by the Examiner

UNITED STATES PATENTS

| | | | |
|---|---|---|---|
| 298,592 | 5/1884 | Kroder | 85—52 X |
| 1,177,996 | 4/1916 | Curry et al. | 174—157 |
| 1,736,043 | 11/1929 | Kyle | 174—166 |
| 2,689,897 | 9/1954 | Lee | 174—153 X |
| 2,935,553 | 5/1960 | Showman | 174—166 X |
| 2,999,895 | 9/1961 | Smith | 174—138 X |

FOREIGN PATENTS 1,272,966   8/1961   France.

LARAMIE E. ASKIN, *Primary Examiner*.